United States Patent [19]

Hirono

[11] 4,207,294
[45] Jun. 10, 1980

[54] PROCESS FOR RECOVERING URANIUM FROM WET-PROCESS PHOSPHORIC ACID

[75] Inventor: Shuichiro Hirono, Kamisaibara, Japan

[73] Assignee: Doryokuro Kakunenryo Kaihatsu Jigyodan, Tokyo, Japan

[21] Appl. No.: 895,104

[22] Filed: Apr. 10, 1978

[30] Foreign Application Priority Data

Apr. 14, 1977 [JP] Japan ................... 52-42968

[51] Int. Cl.² .................................. B01D 11/04
[52] U.S. Cl. ........................ 423/10; 423/11; 423/253; 423/258
[58] Field of Search ............ 423/10, 11, 8, 18, 253, 423/258; 210/21

[56] References Cited

U.S. PATENT DOCUMENTS

| | | | |
|---|---|---|---|
| 2,790,702 | 4/1957 | McCullough | 423/10 |
| 2,830,872 | 4/1958 | McCullough | 423/10 |
| 2,859,092 | 11/1958 | Bailes et al. | 423/10 X |
| 2,860,031 | 11/1958 | Grinstead | 423/10 |
| 2,864,668 | 12/1958 | Baldwin et al. | 423/10 |
| 2,882,123 | 4/1959 | Long | 423/10 |
| 2,902,454 | 9/1959 | Moore | 423/10 X |
| 2,926,992 | 3/1960 | Stedman | 423/18 |
| 2,947,774 | 8/1960 | Levine et al. | 423/10 X |
| 2,958,573 | 11/1960 | Gustison et al. | 423/10 |
| 3,052,514 | 9/1962 | Schmitt | 423/10 |
| 3,153,568 | 10/1964 | Olson et al. | 423/10 |
| 3,443,257 | 3/1966 | Coleman | 423/10 |
| 3,737,513 | 6/1973 | Wiewiorowski et al. | 423/8 X |
| 3,771,591 | 1/1973 | Hurst et al. | 423/10 |
| 3,835,214 | 9/1974 | Hurst et al. | 423/20 X |
| 3,836,476 | 9/1974 | Baldwin et al. | 423/10 |
| 3,966,872 | 6/1976 | Sundar et al. | 423/10 |
| 3,966,873 | 6/1976 | Elikan et al. | 423/10 |
| 4,105,741 | 8/1978 | Wiewiorowski et al. | 423/10 |

OTHER PUBLICATIONS

Murthy, T. K. S. et al., *Study of Some Phenyl Phosphoric Acids for Extraction Uranium from Phosphoric Acid.*
Hurst, F. J. et al. *Recovery of Uranium from Wet-Process Phosphoric Acid by Extraction with Octylphenylphosphoric Acid,* Ind. Eng. Chem. Process Des. 1974.

*Primary Examiner*—Richard E. Schafer
*Attorney, Agent, or Firm*—Wenderoth, Lind & Ponack

[57] ABSTRACT

A process for recovering uranium from a wet-process phosphoric acid crude solution is provided in which the phosphoric acid crude solution is contacted with an organic extractant consisting of octylphenyl phosphoric acid, di(2-ethylhexyl)phosphoric acid and trioctylphosphine oxide dissolved in an organic diluent to extract uranium from the phosphoric acid crude solution. The thus uranium loaded organic extractant is then contacted with mixed acid consisting of hydrofluoric acid and sulfuric acid, or alternatively with concentrated phosphoric acid to back-extract the uranium from the organic extractant.

6 Claims, 8 Drawing Figures

PROCESS FOR RECOVERING URANIUM FROM WET-PROCESS PHOSPHORIC ACID

BACKGROUND OF THE INVENTION

The present invention relates to a process for recovering uranium from a wet-process phosphoric acid crude solution containing uranium, by using a solvent extraction process.

Phosphate rock $Ca_3(PO_4)_2$, which is a raw material for producing phosphoric acid, contains uranium in an amount of about 0.01 wt. % in average, although the amount varies depending upon its locality. Wet-process phosphoric acid is usually produced by the reaction of phosphate rock with sulfuric acid and almost all of the uranium contained in phosphate rock is transferred into the phosphoric acid, hence the resulting crude phosphoric acid contains uranium in an amount of 0.1 g/l in average. The phosphoric acid just after its production contains both tetravalent and hexavalent uranium. In the phosphoric acid produced from uncalcined phosphate rock, the ratio of $U^{4+}$ to $U^{6+}$ is approximately 1:1, while in the phosphoric acid produced from calcined phosphate rock, the most part of the resulting uranium in $U^{4+}$. In our country, phosphoric acid has been produced mainly from uncalcined phosphate rock. Anyway, $U^{4+}$ is gradually oxidized with the passage of time, and all of the uranium turns to $U^{6+}$ after all. However, in the case where uranium is recovered as a by product from wet-process phosphoric acid, since the uranium recovering step is incorporated into the steps of phosphoric acid production or phosphate fertilizer production, the phosphoric acid to be sent to the uranium-recovering step is not so long in the elapse of time after its production, and contains tetravalent and hexavalent uranium in admixture, its temperature being about 40° C.

As for conventional processes for recovering uranium from wet-process phosphoric acid containing tetravalent and hexavalent uranium in admixture as mentioned above, there are an oxidative stripping process as disclosed in U.S. Pat. No. 3,835,214 and a reductive stripping process as disclosed in U.S. Pat. No. 3,711,591. In these prior art processes, uranium has been extracted with a solvent after reduction or oxidation of phosphoric acid. Namely, in the case of the former, uranium in the phosphoric acid is reduced to turn all of the uranium tetravalent, and then extract with octylphenyl phosphoric acid (hereinafter abbreviated to OPPA), and in the subsequent back-extraction, the uranium is oxidized into hexavalent one so as to be easily back-extracted. In the case of the latter, uranium in the phosphoric acid is oxidized to turn all of the uranium hexavalent, and then the hexavalent uranium is extracted with an extractant that extracts hexavalent uranium alone, i.e. with an organic extractant consisting of di(2-ethylhexyl)phosphoric acid (hereinafter abbreviated to D2EHPA) and trioctylphosphine oxide (hereinafter abbreviated to TOPO) dissolved in a diluent, and in the subsequent back-extraction, the uranium is reduced into tetravalent one so as to be easily back-extracted. According to such conventional processes, since metallic iron is mainly employed in the reduction, the amount of iron as an impurity in the phosphoric acid product increases, while since sodium chlorate is mainly employed in the oxidation, problems of corrosion of apparatus and occurrence of by-produced gas are raised, and besides there are drawbacks such that the recovery step, the recovery equipments, etc., are complicated.

SUMMARY OF THE INVENTION

Therefore, in view of the problems associated with these prior art processes, it is an object of the present invention to provide a process for recovering uranium from a wet-process phosphoric acid crude solution in which pre-treatment such as oxidation or reduction of uranium is not required prior to extraction or at the time of back-extraction thereof.

It is another object of the invention to provide a process for recovering uranium from a wet-process phosphoric acid crude solution in which metallic iron as a reducing agent and sodium chlorate as an oxidizing agent are not required to employ, so that the amount of iron impurity contained in phosphoric acid product decreases, and the corrosion of apparatus and occurence of by-produced gas due to sodium chlorate are removed.

It is further object of the invention to provide a process for recovering uranium in which superior recovering effect is accomplished by using simplified process and apparatus.

According to the present invention, there is provided a process for recovering uranium from a wet-process phosphoric acid crude solution produced by the acid-treatment of uncalcined phosphate rock which comprises contacting the phosphoric acid crude solution with an organic extractant consisting of octylphenyl phosphoric acid, di(2-ethylhexyl)phosphoric acid and trioctylphosphine oxide dissolved in an organic diluent to extract uranium from the phosphoric acid crude solution, and then contacting the thus uranium loaded organic extractant with mixed acid consisting of hydrofluoric acid and sulfuric acid to back-extract the uranium as uranium fluoride precipitate from the organic extractant.

The back-extracting step may alternatively be carried out by contacting the uranium loaded organic extractant with concentrated phosphoric acid to back-extract the uranium from the uranium loaded organic extractant.

Other and further objects of the present invenion will become more apparent by reference to the following detailed description when considered in conjunction with the accompanying drawings.

DETAILED DESCRIPTION OF THE INVENTION

According to the present invention, the wet-process phosphoric acid crude solution containing uranium that is produced from uncalcined phosphate rock, is directly treated by solvent extraction with a mixed solvent of three kinds, without subjecting the crude solution to the pre-treatment such as oxidation or reduction. This mixed solvent is prepared by dissolving OPPA, D2EHPA and TOPO in an organic diluent such as, for example, kerosene.

Figure 1:
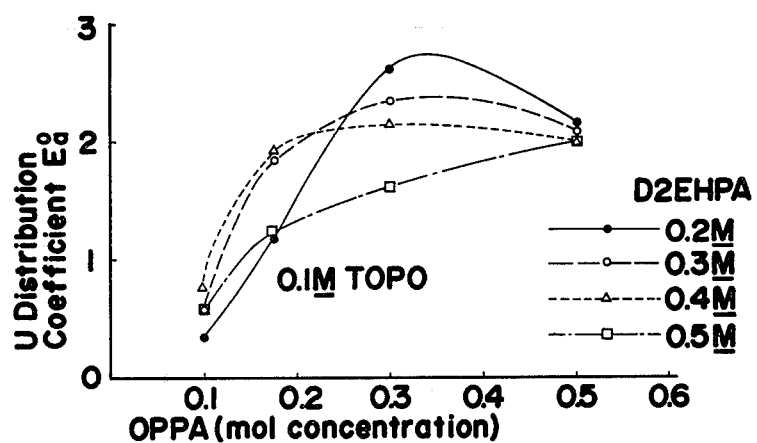
FIG. 1 is a graph showing the relationship between the uranium distribution coefficient and the concentrations of OPPA and D2EHPA at a constant concentration of TOPO.
Figure 2:
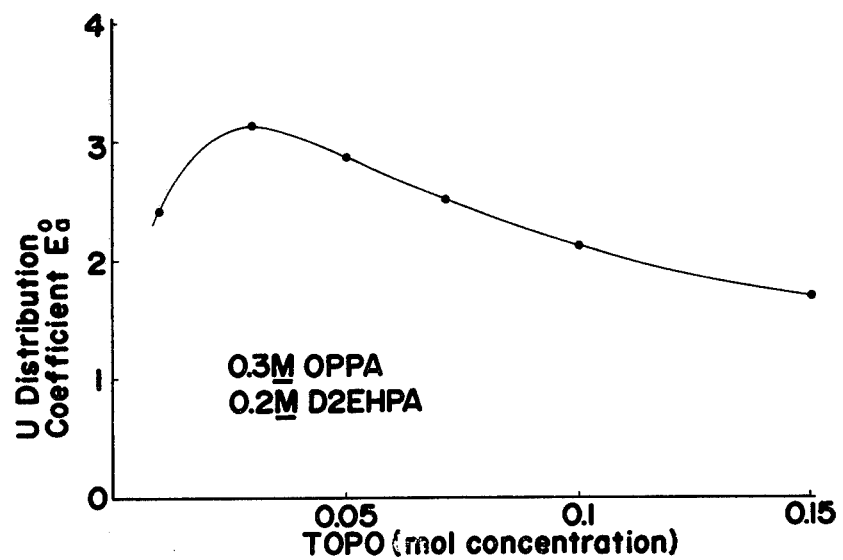
FIG. 2 is a graph showing the relationship between the uranium distribution coefficient and the concentration of TOPO at 0.3 M OPPA and 0.2 M D2EHPA.
Figure 3:
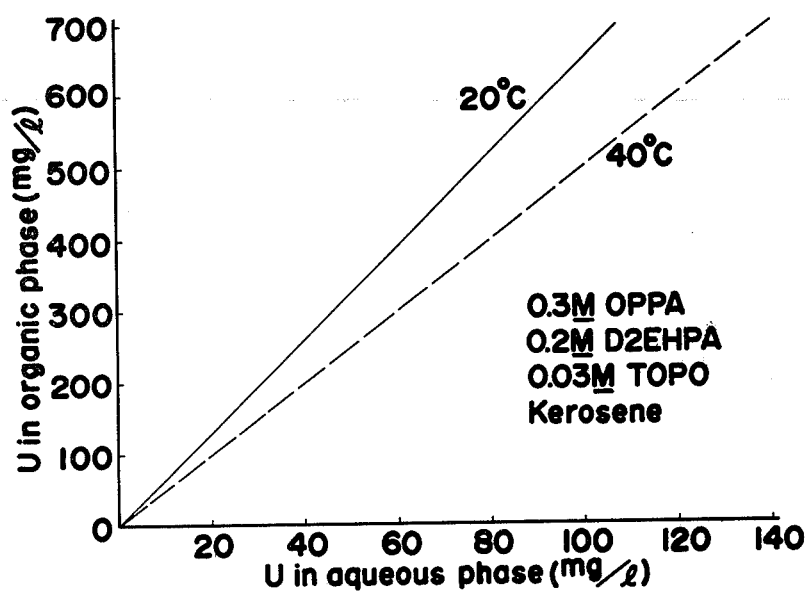
FIG. 3 is a figure of extraction isotherms using the mixed solvent of 0.3 M OPPA, 0.2 M D2EHPA and 0.03 M TOPO dissolved in kerosene.

Since the uranium contained in the phosphoric acid just after produced from the uncalcined phosphate rock contains tetravalent and hexavalent uanium in admixture in a proportion of approximately 1:1, as hereinbefore mentioned, various experiments have been made by using the phosphoric acid of $U^{4+}/U^{6+} + 1$ to give the following results. When the mol concentrations of OPPA and D2EHPA are varied while the mol concentration of TOPO is constant (0.1 M), the resulting uranium distribution coefficient (uranium extraction coefficient) is shown in FIG. 1. The uranium distribution coefficient $E_a^o$ is defined as the ratio of uranium conentration in the organic phase to the uranium concentration in the aqueous phase, i.e. in the phosphoric acid solution. From FIG. 1, it is seen that when the concentration of D2EHPA is 0.1 M, that of TOPO is 0.1 M and that of OPPA is 0.3 to 0.4 M, the maximum uranium distribution coefficient is given. By a series of the experiments having the concentration of TOPO varied, it has been confirmed that such a shape of curve is almost unchanged in spite of any concentration of TOPO. Thus, when the concentration of OPPA is 0.3 M, that of D2EHPA is 0.2 M and the uranium distribution coefficient relative to the concentration of TOPO is plotted, the maximum distribution coefficient (about 3) is given in the case of a TOPO concentration of 0.03 M, as seen from FIG. 2. In view of these results, in the case of the phosphoric acid containing uranium in admixture in a ratio of $U^{4+}/U^{6+} = 1$, the uranium is best extracted by using the mixed solvent consisting of 0.3 M OPPA, 0.2 M D2EHPA and 0.03 M TOPO, and the percentage recovery of uranium by a single operation is 75.9%. The isothrmal figure of extraction at 20° C. and 40° C. in this case are shown in FIG. 3.

Figure 4:
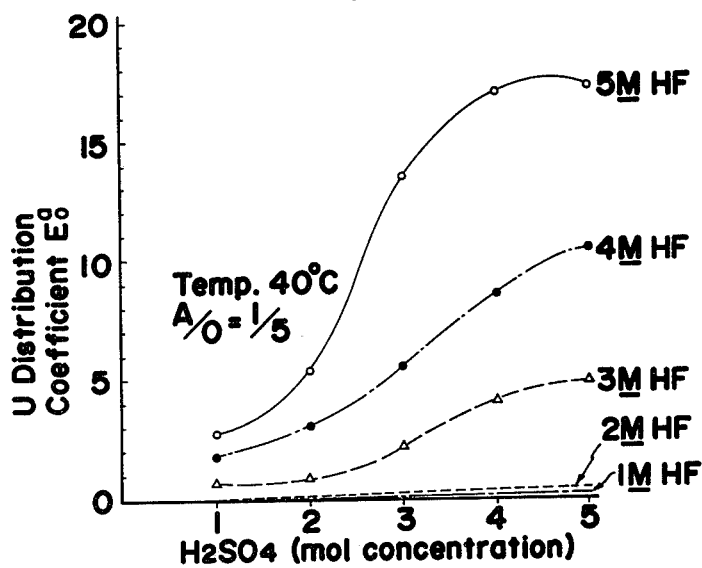
FIG. 4 is a graph showing the relationship between the uranium distribution coefficient and the concentrations of sulfuric acid and hydrofluoric acid.
Figure 5:
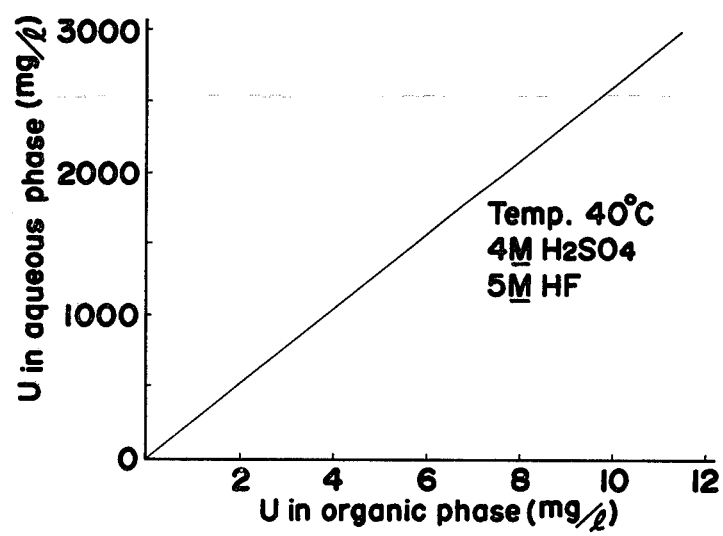
FIG. 5 is a figure of back-extraction isotherm using the mixed acid of 4 M $H_2SO_4$ and 5 M HF.
Figure 6:
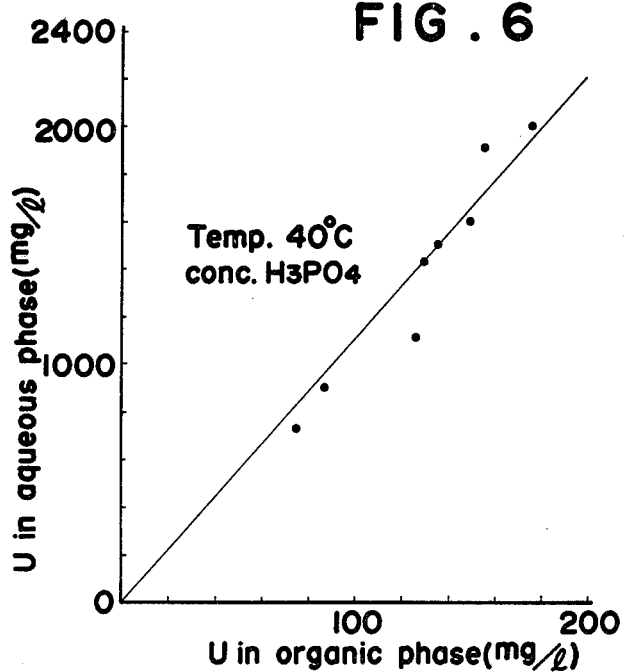
FIG. 6 is a figure of back-extraction isotherm using concentrated phosphoric acid.

For back-extracting uranium from the mixed solvent containing uranium thus obtained, the following two processes can alternatively be employed; the one is a process whrein mixed acid of hydrofluoric acid and sulfuric acid is employed as a back-extracting liquid, and the other is a process wherein concentrated phosphoric acid is employed as a back-extracting liquid. FIG. 4 shows a relationship of the uranium distribution coefficient relative to the change in the concentration of sulfuric acid, making the concentration of hydrofluoric acid a parameter. The uranium distribution coefficient $E_o^a$ in FIG. 4 is defined as the ratio of uranium concentration in the aqueous phase, i.e. in the back-extracting liquid, to the uranium concentartion in the organic phase. In FIG. 4, A/O (amount of aquoeus phase/amount of organic phase) is 1/5. As seen from FIG. 4, the uranium distribution coefficient is best in case where the mixed acid consisting of 4 M $H_2SO_4$ and 5 M HF is employed as the back-extracting liquid. FIG. 5 shows an isothermal figure of the back-extraction at 40° C. using the mixed acid of 4 M $H_2SO_4$ and 5 M HF. When the back-extraction is carried out with the mixed acid of hydrofluoric acid and sulfuric acid, uranium precipitates in the form of uranium fluoride, and the uranium fluoride thus precipitated is also included in the calculation of the distribution coefficient. Accordingly the value of the distribution coefficient varies depending on the value of the A/O. Concretely, in the case of A/O=1/20 to 1/30, the uranium distribution coefficient is about 250 in average. Further, FIG. 6 shows an isothermal figure at 40° C. in case where concentrated phosphoric acid ($P_2O_5 = 71\%$) is employed as the back-extracting liquid, and the uranium distribution coefficient is to an extent of about 10.

Figure 7:
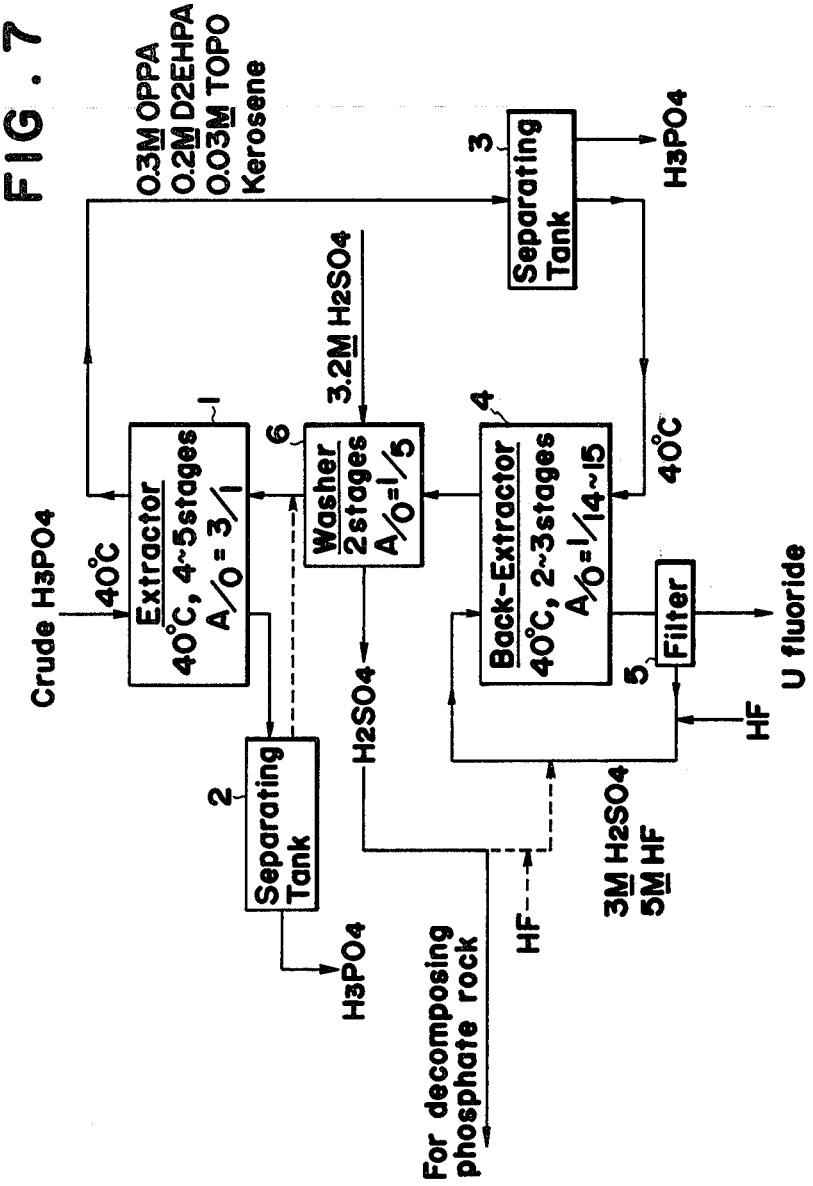
FIG. 7 is a flow sheet of uranium recovery in which sulfuric acid and hydrofluoric acid are employed as a back-extracting liquid.

Next, preferred embodiments of the present invention will be illustrated below. FIG. 7 shows a flow sheet for an example where mixed acid of hydrofluoric acid and sulfuric acid is employed as the back-extracting liquid. A crude phosphoric acid solution containing uranium ($P_2O_5 = 28.3\%$; U = 108 mg/l; and $U^{4+}/U^{6+} = 1$) is sent to an extracting apparatus 1 where uranium is extracted with an extractant consisting of 0.3 M OPPA, 0.2 M D2EHPA and 0.03 M TOPO dissolved in kerosene. This extracting apparatus 1 is a mixer-settler of 4 to 5 stages, A/O being 3/1 and the temperature being maintained at 40° C. In such an extraction, the percentage recovery of uranium is about 95%. The solution of the aqueous phase flowing out of the extracting apparatus 1 is then led to a separating tank 2 where the organic extractant mixed in the aqueous solution is removed to produce phosphoric acid containing no uranium. The organic extractant containing uranium is sent to a separating tank 3 where phosphoric acid mixed in the organic extractant is removed, and the resulting organic extractant is sent to a back-extracting apparatus 4 which is a mixer-settler of 2 to 3 stages, A/O being 1/14 to 1/15 and the temperature being 40° C. A back-extracting liquid consisting of 3 M $H_2SO_4$ and 5 M HF is sent to the back-extracting apparatus 4 and back-extraction is carried out therein. In this back-extraction, uranium precipitates in the form of uranium fluoride, which is then recovered by filtration by means of a filtering apparatus 5. The resulting extract after uranium have been removed is sent to a washing apparatus 6 where it is washed with 3.2 M $H_2SO_4$ and then sent again to the extracting apparatus 1. Further sulfuric acid from the washing apparatus 6 may be used as acid for decomposing phosphate rock.

Figure 8:
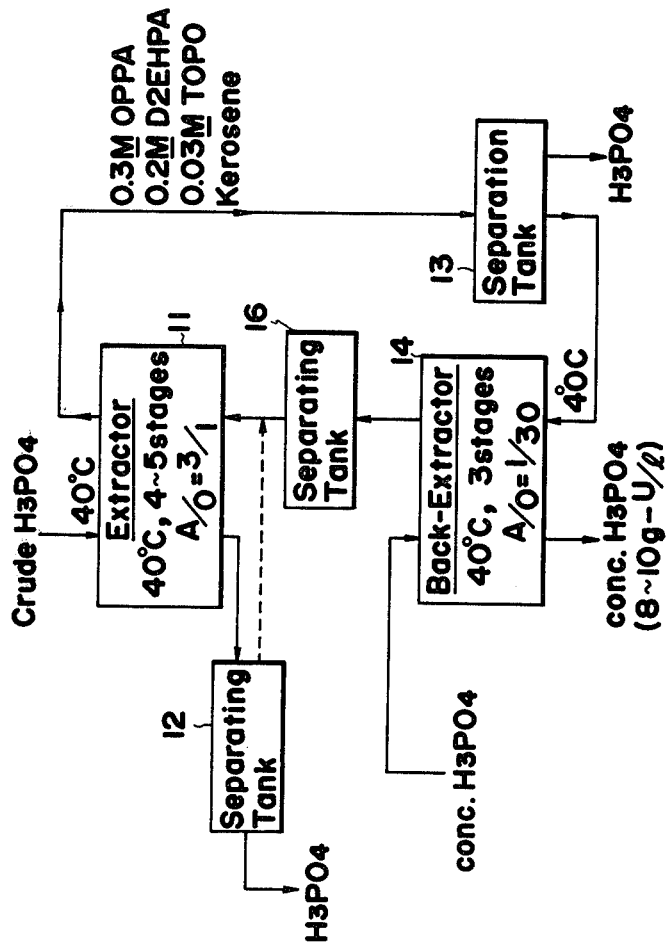
FIG. 8 is a flow sheet of uranium recovery in which concentrated phosphoric acid is employed as a back-extracting liquid.

FIG. 8 shows a flow sheet for another example where concentrated phosphoric acid is employed as the back-extracting liquid. In the same manner as in the above-mentioned example, a crude phosphoric acid containing uranium ($P_2O_5 = 28.3\%$; U = 108 mg/l; and $U^{4+}/U^6 = 1$) is sent to an extracting apparatus 11 where uranium is extracted with an extractant consisting of 0.3 M OPPA, 0.2 M D2EHPA and 0.03 M TOPO dissolved in kerosene. This extracting apparatus 11 is a mixer-settler of 4 to 5 stages, the temperature being 40° C. and A/O being 3/1. In such an extraction, the percentage recovery of uranium is about 95%. The solution of the aqueous phase flowing out of the extracting apparatus 11 is then led to a separating tank 12 where the organic extractant mixed in the aqueous solution is removed to produce phosphoric acid containing no uranium. The organic extractant containing uranium is sent to a separating tank 13 where phosphoric acid mixed in the organic extractant is removed, and the resulting organic extractant is sent to a back-extracting apparatus 14, which is a mixer-settler of 3 stages, the temperature being 40° C. and A/O being 1/30. Concentrated phosphoric acid ($P_2O_5=71\%$) as a back-extracting liquid is sent to the back-extracting apparatus 14 and back-extraction is carried out therein. In this back-extraction, uranium is concentrated into 8 to 10 g=U/l in the back-extracting liquid of concentrated phosphoric acid. The extract after uranium have been removed is sent via a separating tank 16 again to the extracting apparatus 11. For recovering uranium from the uranium concentrate thus obtained, uranium is again extracted with a mixed solvent of D2EHPA and TOPO and then back-extracted with an ammonium carbonate solution to precipitate in the form of its ammonium salt which may be filtered.

In addition, in each of the above-mentioned examples, the mixer-settler has been employed for extraction and back-extraction, but it is also possible to employ cruise columns. It is rather advantageous in the points of phase separation and the like to employ pulse columns.

Since the present invention provides a process for recovering uranium from wet-process phosphoric acid according to solvent-extraction process, as hereinabove described, it is not necessary to carry out any pre-treatment such as oxidation, reduction, and the like prior to extracting uranium from a crude phosphoric acid solution containing uranium, nor is it also necessary to carry out oxidative back-extraction or reductive back-extraction. It is therefore possible to solve the problems of the increase in the amount of impurity contained in the phosphoric acid porduct due to metallic iron added as a reducing agent, the corrosion of apparatus due to sodium chlorate employed as an oxidizing agent, the occurrence of by-produced gas, etc., and yet superior recovering effect is accomplished with simplified process and apparatus. Accordingly, the present invention is a suitable process for small scale phosphoric acid factories. In particular, the process of the present invention wherein mixed acid of hydrofluoric acid and sulfuric acid is employed as a back-extracting liquid is advantageous in that the equipments are notably simplified.

It is to be understood that the foregoing description is illustrative rather than limiting on the invention, and that various changes and modifications may be made without departing from the spirit of the invention.

What is claimed is:

1. A process for recovering uranium from a wet-process phosphoric acid crude solution produced by the acid-treatment of uncalcined phosphate rock which comprises contacting the phosphoric acid crude solution with an organic extractant consisting of octylphenyl phosphoric acid, di(2-ethylhexyl)phosphoric acid and trioctylphosphine oxide dissolved in an organic diluent to extract uranium from the phosphoric acid crude solution, and then contacting the thus uranium loaded organic extractant with mixed acid consisting of hydrofluoric acid and sulfuric acid to back-extract the uranium as uranium fluoride precipitate from the organic extractant.

2. The process according to claim 1, wherein the organic extractant consists of 0.3 M octylphenyl phosphoric acid, 0.2 M di(2-ethylhexyl)phosphoric acid and 0.03 M trioctylphosphine oxide dissolved in kerosene.

3. The process according to claim 1, wherein the mixed acid consists of 5 M hydrofluoric acid and 3 M sulfuric acid.

4. A process for recovering uranium from a wet-process phosphoric acid crude solution produced by the acid-treatment of uncalcined phosphate rock which comprises contacting the phosphoric acid crude solution with an organic extractant consisting of octylphenyl phosphoric acid, di(2-ethylhexyl)phosphoric acid and trioctylphosphine oxide dissolved in an organic diluent to extract uranium from the pnosphoric acid crude solution, and then contacting the thus uranium loaded organic extractant with concentrated phosphoric acid to back-extract the uranium from the organic extractant.

5. The process according to claim 4, wherein the organic extractant consists of 0.3 M octylphenyl phosphoric acid, 0.2 M di(2-ethylhexyl)phosphoric acid and 0.03 M trioctylphosphine oxide dissolved in kerosene.

6. The process according to claim 4, wherein the concentrated phosphoric acid has a concentration of 71% as $P_2O_5$.

* * * * *